United States Patent
Aida et al.

(10) Patent No.: US 7,428,195 B2
(45) Date of Patent: Sep. 23, 2008

(54) INFORMATION REPRODUCTION APPARATUS AND INFORMATION REPRODUCTION METHOD

(75) Inventors: Kazutoshi Aida, Hirakata (JP); Youichi Ogura, Saijo (JP); Toshihiko Takahashi, Kawachinagano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 457 days.

(21) Appl. No.: 10/530,276

(22) PCT Filed: May 14, 2004

(86) PCT No.: PCT/JP2004/006914

§ 371 (c)(1),
(2), (4) Date: Apr. 5, 2005

(87) PCT Pub. No.: WO2004/102540

PCT Pub. Date: Nov. 25, 2004

(65) Prior Publication Data

US 2006/0062118 A1 Mar. 23, 2006

(30) Foreign Application Priority Data

May 14, 2003 (JP) .............................. 2003-135804

(51) Int. Cl.
*G11B 7/005* (2006.01)
(52) U.S. Cl. ............... 369/47.17; 369/47.14; 369/53.12
(58) Field of Classification Search ........................ None
See application file for complete search history.

(56) References Cited

U.S. PATENT DOCUMENTS

| | | | | | |
|---|---|---|---|---|---|
| 5,497,361 | A | * | 3/1996 | Mita et al. | 369/47.18 |
| 5,570,335 | A | * | 10/1996 | Ogata et al. | 369/124.05 |
| 5,999,510 | A | * | 12/1999 | Enomoto | 369/124.13 |
| 6,765,855 | B1 | * | 7/2004 | Adachi et al. | 369/59.17 |
| 2002/0080694 | A1 | | 6/2002 | Chou et al. | |

FOREIGN PATENT DOCUMENTS

| | | |
|---|---|---|
| JP | 60-13362 | 1/1985 |
| JP | 10-106160 | 4/1998 |
| JP | 11-195271 | 7/1999 |
| JP | 2001-229617 | 8/2001 |
| JP | 2002-319239 | 10/2002 |

* cited by examiner

*Primary Examiner*—Andrea Wellington
*Assistant Examiner*—Michael V Battaglia
(74) *Attorney, Agent, or Firm*—Wenderoth, Lind & Ponack, L.L.P.

(57) ABSTRACT

An information reproduction apparatus and method according to the present invention are provided so as to solve the problem that signal quality is degraded in a normal signal part when always performing a correction of a transient in reproducing information recorded in a medium, and the sag cancellation controller (103) detects whether the pickup output signal (S101) is normal or abnormal, and the sag cancellation part (104) performs a correction of a transient only during a period when the pickup output signal (S101) is detected as abnormal, thereby preventing degradation of signal quality, which is caused by performing a correction of a transient on a normal signal part, and an appropriate correction of a transient can be performed on an abnormal signal part, thereby enabling a stable reproduced signal (S104) to be obtained.

41 Claims, 8 Drawing Sheets

INFORMATION REPRODUCTION APPARATUS AND INFORMATION REPRODUCTION METHOD

TECHNICAL FIELD

The present invention relates to an information reproduction apparatus that can improve signal quality of reproduced data, and more particularly, to an information reproduction apparatus which performs a correction of a transient on a signal extracted by a pickup, to obtain reproduced data of reduced signal degradation.

BACKGROUND ART

At present when a market for information reproduction apparatus is growing, a higher quality of a reproduced signal is required for an information reproduction apparatus. At reproducing information while a higher quality of information being desired, when there are defects in the recording medium or dusts, fingerprints, or the like are attached to the recording medium, signals extracted by a pickup sometimes become unstable. However, if it is not the case that information can be stably reproduced even in such a situation, an information reproduction apparatus providing a higher quality of reproduced signal cannot be obtained.

Therefore, in a prior art information reproduction apparatus as disclosed in Japanese Published Patent Application No. Hei.10-106160, sag cancellation for correcting a transient state of a pickup is always performed to obtain an appropriate reproduced signal in response to unstable reproduction states.

Such sag cancellation that performs correction of transient to a signal has been a very effective means for improving stability of a reproduced signal after passing on defects.

In the prior art information reproduction apparatus, however, since correction of a transient is always performed to the signal which is extracted by a pickup, while a quality of a reproduced signal over defect parts is improved, the signals outside the defect parts are also compressed, thereby resulting in signal jitters being actually degraded.

The present invention is directed to the above-described problems, and has for its object to provide an information reproduction apparatus that can improve stability of a reproduced signal after passing over defects, as well as can reduce quality deterioration in the normal signal parts that have no defects.

DISCLOSURE OF THE INVENTION

According to a first aspect of the present invention, there is provided an information reproduction apparatus that reproduces information recorded in a medium, which comprises: a pickup for extracting the information recorded in the medium and outputting the extracted signal; a sag detection part for detecting a transient state of the signal outputted from the pickup and outputting the detection result as a transient state detection signal; a sag cancellation controller for detecting whether the signal outputted from the pickup is normal or abnormal; and a sag cancellation part for performing no correction of a transient on the signal outputted from the pickup during a period that is judged as normal by the sag cancellation controller, and performing a correction of a transient on the signal outputted from the pickup on the basis of the transient state detection signal outputted from the sag detection part only during a period that is judged as abnormal by the sag cancellation controller.

In the information reproduction apparatus according to the first aspect, degradation of signal quality, which is caused by performing a correction of a transient on a normal signal part, can be prevented, and an appropriate correction of a transient can be performed on an abnormal signal part, thereby resulting in a stable reproduced signal obtained from the sag cancellation part.

According to a second aspect of the present invention, there is provided an information reproduction apparatus that reproduces information recorded in a medium, which comprises: a pickup for extracting the information recorded in the medium and outputting the extracted signal; an AD conversion part for subjecting the signal outputted from the pickup to analog-digital conversion; a sag detection part for detecting a transient state of the digital signal outputted from the AD conversion part and outputting the detection result as a transient state detection signal; a sag cancellation controller for detecting whether the digital signal outputted from the AD conversion part is normal or abnormal; and a sag cancellation part for performing no correction of a transient on the digital signal outputted from the AD conversion part during a period that is judged as normal by the sag cancellation controller, and performing a correction of a transient on the digital signal outputted from the AD conversion part on the basis of the transient state detection signal outputted from the sag detection part only during a period that is judged as abnormal by the sag cancellation controller.

In the information reproduction apparatus according to the second aspect, the sag detection part, the sag cancellation controller, and the sag cancellation part can be constructed by digital circuits, and thereby a circuit configuration that is advantageous to a process shrink is obtained. Further, differently from when the sag detection part, the sag cancellation controller, and the sag cancellation part are constructed by analog circuits, capacitors and the like are dispensed with, and the circuit area is reduced.

According to a third aspect of the present invention, there is provided an information reproduction apparatus that reproduces information recorded in a medium, which comprises: a pickup for extracting the information recorded in the medium and outputting the extracted signal; an AD conversion part for subjecting the signal outputted from the pickup to analog-digital conversion; a sag detection part for detecting a transient state of the signal outputted from the pickup and outputting the detection result as a transient state detection signal; a sag cancellation controller for detecting whether the digital signal outputted from the AD conversion part is normal or abnormal; and a sag cancellation part for performing no correction of a transient on the digital signal outputted from the AD conversion part during a period that is judged as normal by the sag cancellation controller, and performing a correction of a transient on the digital signal outputted from the AD conversion part on the basis of the transient state detection signal outputted from the sag detection part only during a period that is judged as abnormal by the sag cancellation controller.

In the information reproduction apparatus according to the third aspect, the sag cancellation controller and the sag cancellation part can be constructed by digital circuits with maintaining response performance of the sag detection part, and thereby a circuit configuration that is advantageous to a process shrink is obtained. Further, differently from when the sag cancellation controller and the sag cancellation part are constructed by analog circuits, capacitors and the like are dispensed with and the circuit area is reduced.

According to a fourth aspect of the present invention, there is provided an information reproduction apparatus that reproduces information recorded in a medium, which comprises: a pickup for extracting the information recorded in the medium and outputting the extracted signal; an AD conversion part for subjecting the signal outputted from the pickup to analog-digital conversion; a sag detection part for detecting a transient state of the digital signal outputted from the AD conversion part and outputting the detection result as a transient state detection signal; a sag cancellation controller for detecting whether the signal outputted from the pickup is normal or abnormal; and a sag cancellation part for performing no correction of a transient on the digital signal outputted from the AD conversion part during a period that is judged as normal by the sag cancellation controller, and performing a correction of a transient on the digital signal outputted from the AD conversion part on the basis of the transient state detection signal outputted from the sag detection part only during a period that is judged as abnormal by the sag cancellation controller.

In an information reproduction apparatus according to the fourth aspect, the sag detection part and the sag cancellation part can be constructed by digital circuits with maintaining response performance of the sag cancellation controller, and thereby a circuit configuration that is advantageous to a process shrink is obtained. Further, differently from when the sag detection part and the sag cancellation part are constructed by analog circuits, capacitors and the like are dispensed with and the circuit area is reduced.

According to a fifth aspect of the present invention, there is provided an information reproduction apparatus that reproduces information recorded in a medium, which comprises: a pickup for extracting the information recorded in the medium and outputting the extracted signal; an AD conversion part for subjecting the signal outputted from the pickup to analog-digital conversion; a sag detection part for detecting a transient state of the signal outputted from the pickup and outputting the detection result as a transient state detection signal; a sag cancellation controller for detecting whether the signal outputted from the pickup is normal or abnormal; and a sag cancellation part for performing no correction of a transient on the digital signal outputted from the AD conversion part during a period that is judged as normal by the sag cancellation controller, and performing a correction of a transient on the digital signal outputted from the AD conversion part on the basis of the transient state detection signal outputted from the sag detection part only during a period that is judged as abnormal by the sag cancellation controller.

In an information reproduction apparatus according to the fifth aspect, the sag cancellation part can be constructed by a digital circuit with maintaining response performances of the sag detection part and the sag cancellation controller, and thereby a circuit configuration that is advantageous to a process shrink is obtained. Further, differently from when the sag cancellation part is constructed by analog circuits, capacitors and the like are dispensed with and the circuit area is reduced.

According to a sixth aspect of the present invention, there is provided an information reproduction apparatus in which the sag cancellation controller judges whether the signal outputted from the pickup is normal or abnormal, on the basis of defect information that is detected from the signal outputted from the pickup.

According to a seventh aspect of the present invention, there is provided an information reproduction apparatus in which the sag cancellation controller judges whether the signal outputted from the pickup is normal or abnormal, on the basis of de-tracking detection information indicating that the pickup is in a de-tracking state.

According to an eighth aspect of the present invention, there is provided an information reproduction apparatus in which the sag cancellation controller judges whether the signal extracted by the pickup is normal or abnormal, on the basis of de-tracking detection information indicating that the pickup is in a de-tracking state, and defect information that is detected from the signal outputted from the pickup.

According to a ninth aspect of the present invention, there is provided an information reproduction apparatus in which the sag cancellation controller further extends, by a predetermined period, a defect period indicated by the defect information, and judges the extended period as a period during which the signal extracted by the pickup is abnormal.

According to a tenth aspect of the present invention, there is provided an information reproduction apparatus in which the sag cancellation controller judges whether the signal outputted from the pickup is normal or abnormal, on the basis of amplitude information of the signal outputted from the pickup.

According to an eleventh aspect of the present invention, there is provided an information reproduction apparatus which comprises a PLL for making a binarized signal of the signal outputted from the sag cancellation part follow a reference frequency, and the sag cancellation controller judging whether the signal extracted by the pickup is normal or abnormal, on the basis of state information outputted from the PLL.

According to a twelfth aspect of the present invention, there is provided an information reproduction method for reproducing information recorded in a disk, which comprises: a sag detection step of detecting a transient state of the signal read from the disk and outputting the detection result as a transient state detection signal; a sag cancellation control step of detecting whether the signal from the disk is normal or abnormal; a sag cancellation step of performing no correction of a transient on the signal from the disk during a period that is judged as normal in the sag cancellation control step, and performing a correction of a transient on the signal read from the disk on the basis of the transient state detection signal only during a period that is judged as abnormal in the sag cancellation control step.

In the information reproduction method according to the twelfth aspect, degradation of signal quality, which is caused by performing a correction of a transient on a normal signal part, can be prevented, and an appropriate correction of a transient can be performed on an abnormal signal part, thereby resulting in a stable reproduced signal obtained from the sag cancellation part.

BEST MODE TO EXECUTE THE INVENTION

Embodiment 1

Figure 1:
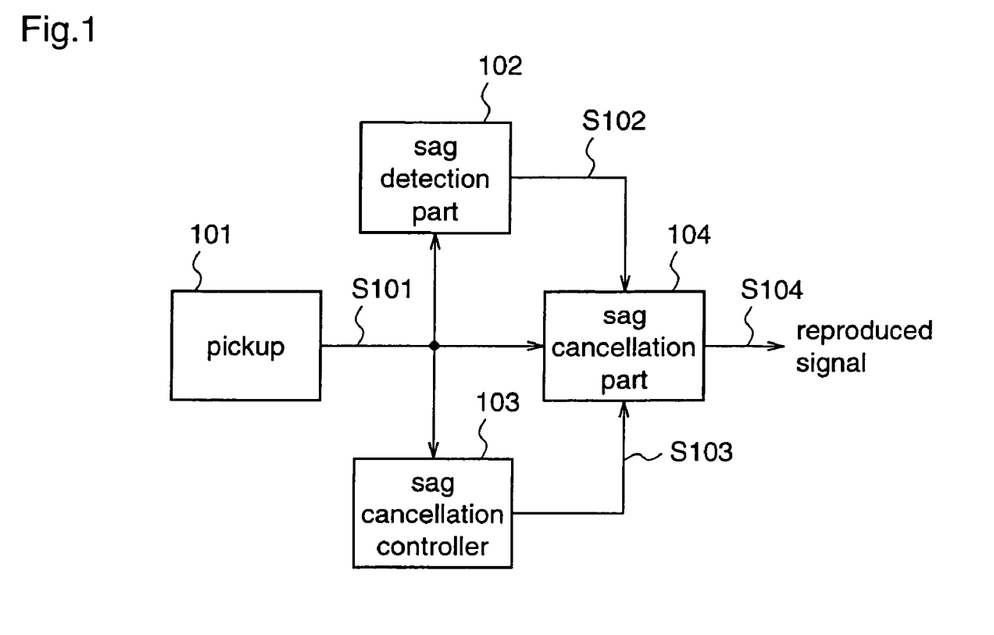
FIG. 1 is a block diagram illustrating an example of a construction of an information reproduction apparatus according to a first embodiment of the present invention.

FIG. 1 is a block diagram illustrating an example of a construction of an information reproduction apparatus according to a first embodiment of the present invention.

In FIG. 1, an information reproduction apparatus according to the present invention comprises a pickup 101, a sag detection part 102, a sag cancellation controller 103, and a sag cancellation part 104. Here, the sag detection part 102, the sag cancellation controller 103, and the sag cancellation part 104 are constructed by analog circuits, respectively.

The pickup 101 extracts information recorded in a medium, and outputs the extracted signal S101 to the sag detection part 102, the sag cancellation controller 103, and the sag cancellation part 104, respectively.

The sag detection part 102 detects a state of a transient of the pickup output signal S101, and here the sag detection part 102 obtains a sag on the basis of the intermediate point between a peak envelope and a bottom envelope of the pickup output signal S101 and outputs the obtained sag to the sag cancellation part 104 as a transient state detection signal S102.

The sag cancellation controller 103 detects whether the pickup output signal S101 is normal or abnormal, and here the controller 103 detects defect information from the pickup output signal S101, and thereafter judges a defect part as an abnormal signal and judges a part other than the defect part as a normal signal, and outputs the signal to the sag cancellation part 104 as a sag cancellation control signal S103 indicating that the pickup output signal S101 is normal or that it is abnormal.

The sag cancellation part 104 decides whether a correction of a transient of the pickup output signal S101 is to be performed or not, on the basis of the sag cancellation control signal S103 outputted from the sag cancellation controller 103, and performs a correction of a transient only on the signals requiring the correction of the transient. To be specific, no correction of a transient of the pickup output signal S101 is performed during a period that the sag cancellation controller 103 judges as normal, while a correction of a transient of the pickup output signal S101 is performed on the basis of the transient state detection signal S102 which is detected by the sag detection part 102 only during a period that the sag cancellation controller 103 judges as abnormal, thereby outputting the generated signal as a reproduced signal S104.

Next, an operation of the information reproduction apparatus according to the first embodiment of the present invention will be described.

Hereinafter, an operation of the sag detection part 102 will be initially described.

Figure 2:
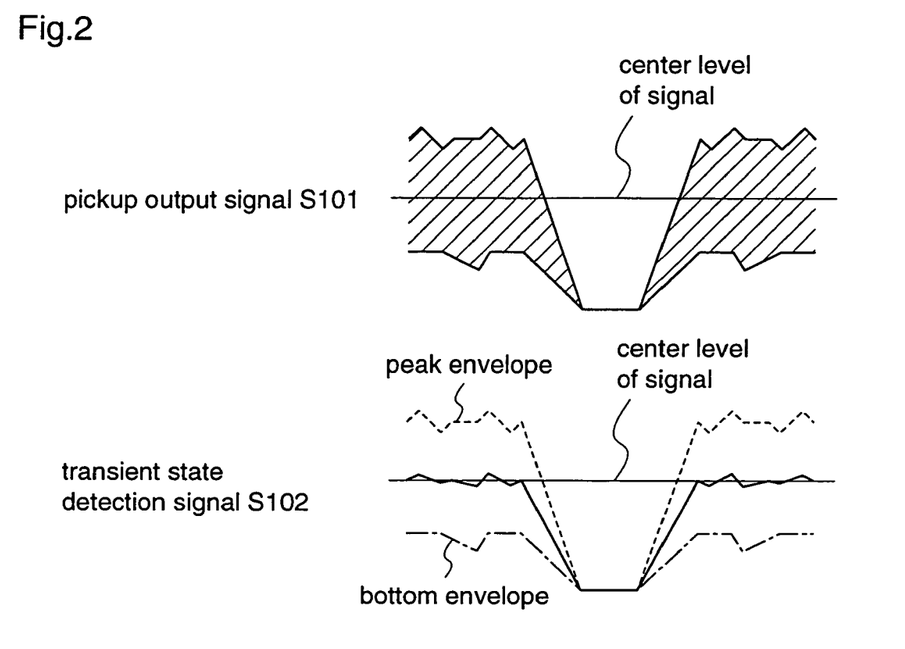
FIG. 2 is a diagram for explaining an operation of a sag detection part in the information reproduction apparatus according to the first embodiment of the present invention.

FIG. 2 is a diagram for explaining an operation of the sag detection part 102.

In FIG. 2, a pickup output signal S101 outputted from the pickup 101, and a transient state detection signal S102 outputted from the sag detection part 102 are shown in order starting at the top.

When the pickup output signal S101 is input to the sag detection part 102, the sag detection part 102 initially detects a peak envelope and a bottom envelope of the pickup output signal S101 (dashed lines in FIG. 2), performs an operation of (peak envelope+bottom envelope)/2, and calculates an intermediate point between the peak envelope and the bottom envelope.

Then, the sag detection part 102 outputs a sag so obtained from the intermediate point between the peak envelope and the bottom envelope to the sag cancellation part 104 as a transient state detection signal S102.

Next, an operation of the sag cancellation controller 103 will be described.

Figure 3:
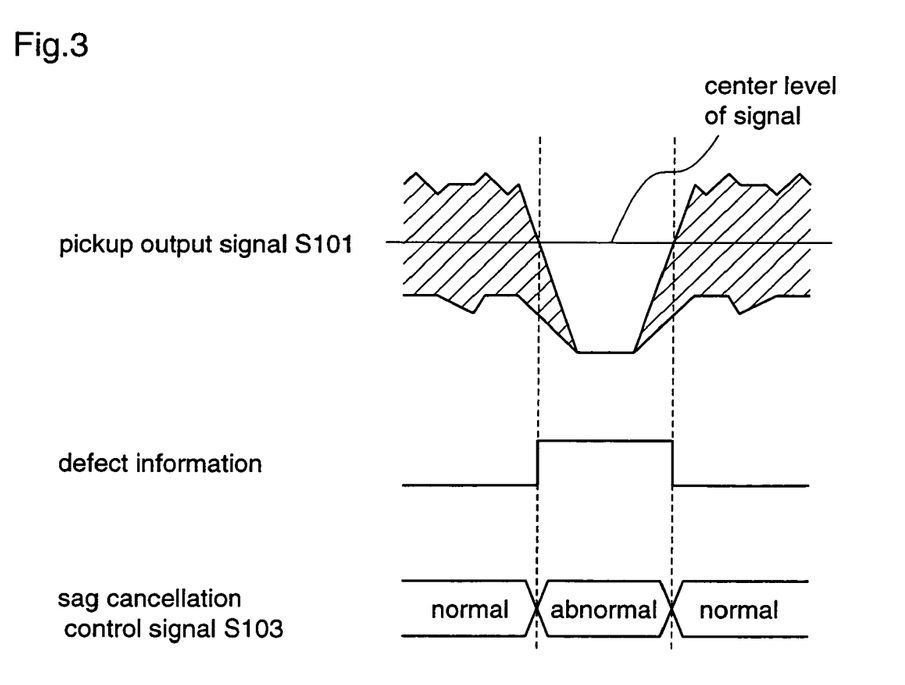
FIG. 3 is a diagram for explaining an operation of a sag cancellation controller in the information reproduction apparatus according to the first embodiment of the present invention.

FIG. 3 is a diagram for explaining an operation of the sag cancellation controller 103.

In FIG. 3, a pickup output signal S101 outputted from the pickup 101, defect information detected by the sag cancellation controller 103, and a sag cancellation control signal S103 outputted from the sag cancellation controller 103 are shown in order starting at the top.

When the pickup output signal S101 is input to the sag cancellation controller 103, the sag cancellation controller 103 initially detects defect information.

As a specific example of the detection of the defect information, for example, it can be considered that the sag cancellation controller 103 compares the pickup output signal S101 with slice level for defect detection, and when the signal level of the pickup output signal S101 appears on the darker side than the slice level for defect detection, the signal is detected as defect information. Then, in FIG. 3, the center level of the pickup output signal S101 is used as the slice level for defect detection, and when the peak envelope of the pickup output signal S101 appears on the darker side than the slice level for defect detection, the signal is detected as defect information.

Next, the sag cancellation controller 103 judges that a period which is detected as defect is an abnormal signal while the controller 103 judges that a period during which no defect is detected is a normal signal, on the basis of the detected defect information, and the controller 103 outputs the sag cancellation control signal S103 shown in FIG. 3 to the sag cancellation part 104.

Finally, an operation of the sag cancellation part 104 will be described.

Figure 4:
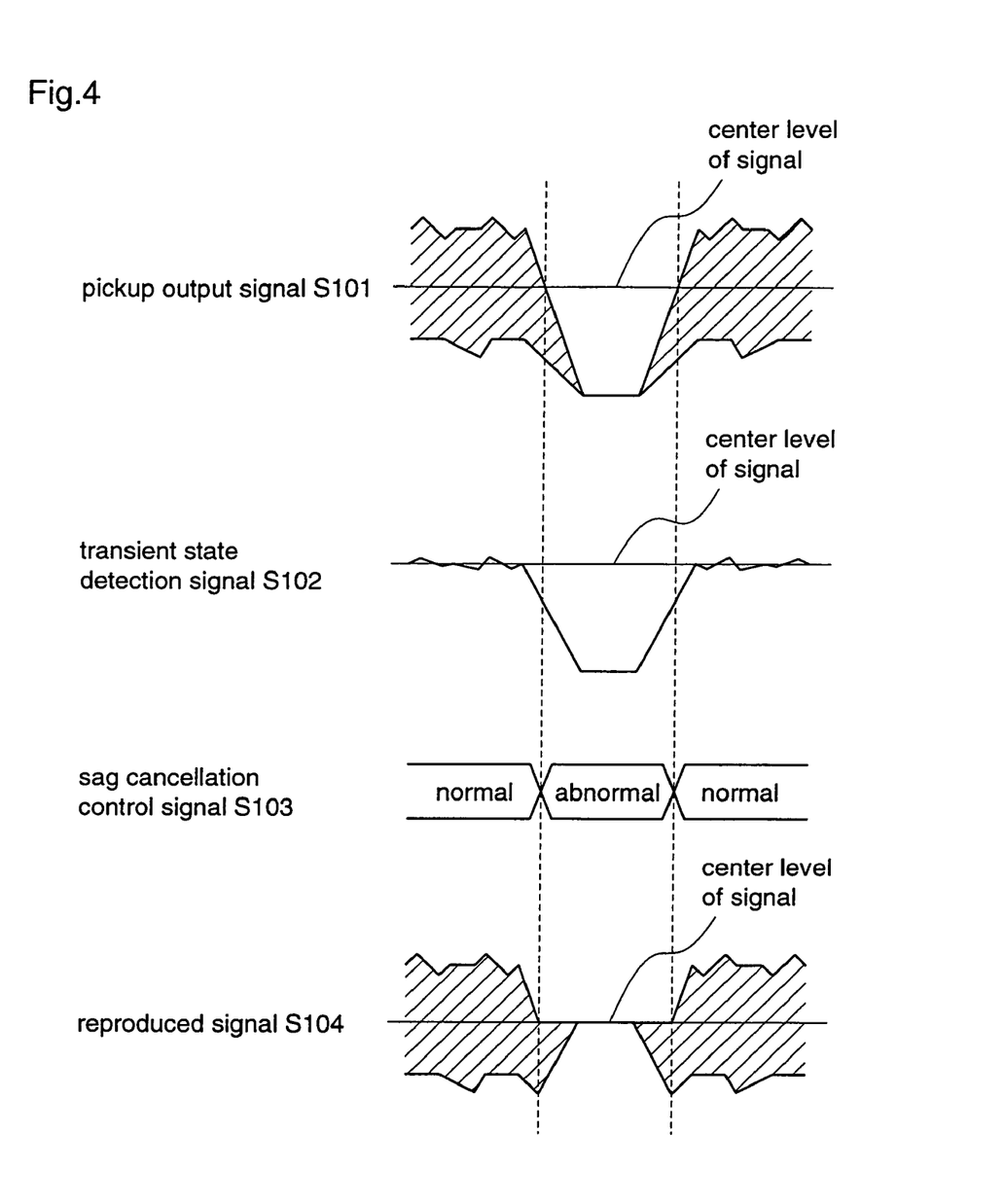
FIG. 4 is a diagram for explaining an operation of a sag cancellation part in the information reproduction apparatus according to the first embodiment of the present invention.

FIG. 4 is a diagram for explaining an operation of the sag cancellation part 104.

In FIG. 4, a pickup output signal S101 outputted from the pickup 101, a transient state detection signal S102 outputted from the sag detection part 102, a sag cancellation control signal S103 outputted from the sag cancellation controller 103, and a reproduced signal S104 outputted from the sag cancellation part 104 are shown in order starting at the top.

The sag cancellation part 104 initially decides whether a correction of a transient of the pickup output signal S101 is to be performed or not on the basis of the sag cancellation control signal S103 outputted from the sag cancellation controller 103.

To be specific, no correction of the transient is performed during a period that is indicated as normal by the sag cancellation control signal S103 while the correction of the transient is performed only during a period that is indicated as abnormal by the sag cancellation control signal S103.

Then, the sag cancellation part 104 outputs, as a reproduced signal S104, the pickup output signal S101 as it is during a period that is indicated as normal by the sag cancellation control signal S103, thereby preventing the degradation of signal quality, which is caused by performing a correction of a transient on a normal signal part.

On the other hand, the sag cancellation part 104 performs a correction of a transient of the pickup output signal S101 during a period that is indicated as abnormal by the sag cancellation control signal S103, and outputs the corrected signal as a reproduced signal S104.

Then, the correction of the transient of the pickup output signal S101 performed by the sag cancellation part 104 is performed by correcting the pickup output signal S101 so that the transient state detection signal S102 detected by the sag detection part 102 is made close to the center level of the signal.

As described above, in the information reproduction apparatus according to the first embodiment of the present invention, the sag cancellation controller 103 detects whether the pickup output signal S101 is normal or abnormal on the basis of the defect information, and the sag cancellation part 104 performs a correction of a transient only during a period when the pickup output signal S101 is detected to be abnormal, thereby it is possible to prevent the degradation of signal quality, which is caused by performing the correction of the transient on a normal signal part, and also possible to perform an appropriate correction of a transient on an abnormal signal part, thereby resulting in a stable reproduced signal S104 obtained by the sag cancellation part 104.

Then, in the information reproduction apparatus according to the first embodiment of the present invention, the sag detection part 102 detects an intermediate point between a peak envelope and a bottom envelope, and the sag cancellation part 104 performs a correction of a transient on a pickup output signal S101 so as to make the intermediate point between the peak envelope and the bottom envelope, which is detected by the sag detection part 102, close to the center level of the pickup output signal S101. However, the sag detection part 102 may detect only either a peak envelope or a bottom envelope, and the sag cancellation part 104 may perform a correction of a transient on a pickup output signal S101 so as to make the detected peak envelope or bottom envelope close to the center level of the pickup output signal S101, or otherwise the sag detection part 102 may detect a DC component of a pickup output signal S101 (RF signal), and the sag cancellation part 104 may perform a correction of a transient on the pickup output signal S101 so as to make the integration level of the detected DC component of the pickup output signal S101 close to zero.

Figure 5:
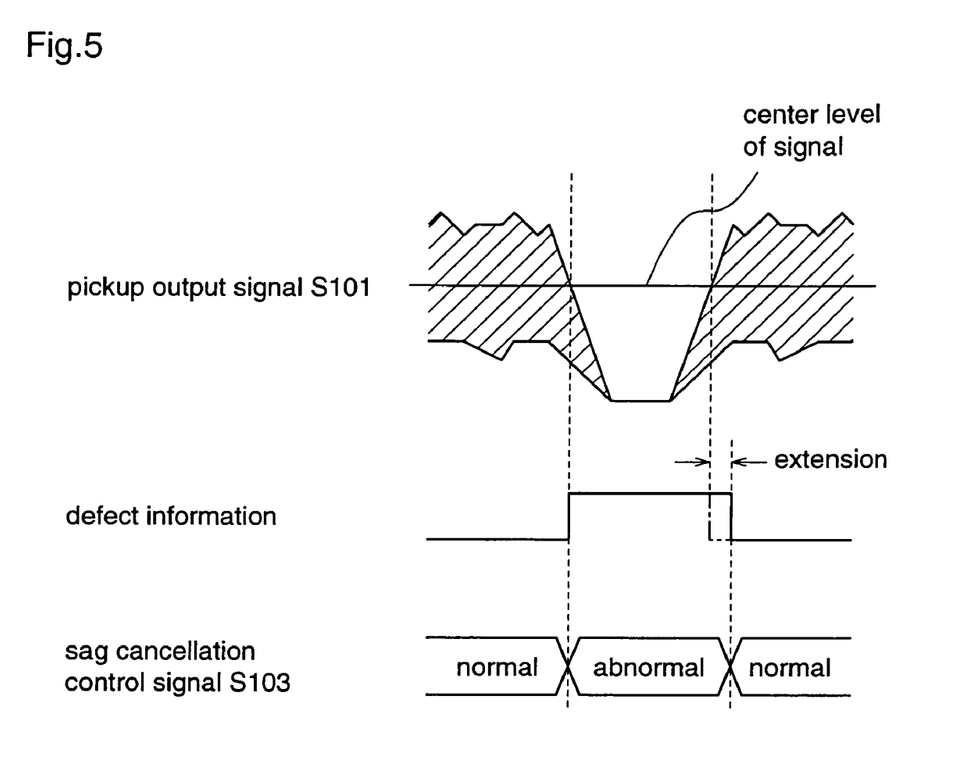
FIG. 5 is a diagram for explaining another example of an operation of the sag cancellation controller in the information reproduction apparatus according to the first embodiment of the present invention.

Moreover, while the sag cancellation controller 103 in the information reproduction apparatus according to the first embodiment of the present invention employs, as a method for detecting defect information, a method which detects, when the envelope of the pickup output signal S101 appears on the darker side in signal level that is lower than the slice level that is previously determined for detecting a defect, its appearance as defect information, the any other method may be used as a method for detecting defect information. For example, as shown in FIG. 5, it is possible to extend the defect information that is detected as shown in FIG. 3 by a predetermined time period so as to extend a period that is judged as abnormal by the sag cancellation control signal S103 by the predetermined time period, thereby to compensate an error due to a response delay in the sag cancellation controller 103.

Further, while the sag cancellation controller 103 in the information reproduction apparatus according to the first embodiment of the present invention uses the defect information to judge whether the signal outputted from the pickup 101 is normal or abnormal, it may be constructed such that the sag cancellation controller 103 should detect output amplitude information of the signal that is outputted from the pickup 101, and judge parts for which the output amplitude is smaller than a predetermined amplitude as abnormal signals and parts other than those as normal signals, and thereby outputting a signal as the sag cancellation control signal S103 that indicates the pickup output signal S101 being normal or abnormal, to the sag cancellation part 104.

Embodiment 2

Figure 6:
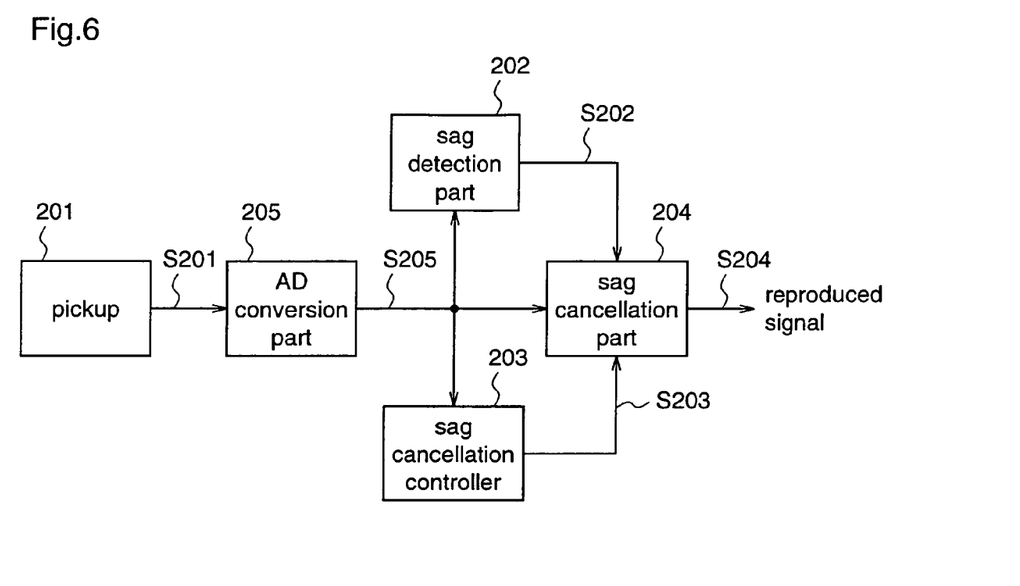
FIG. 6 is a block diagram illustrating an example of a construction of an information reproduction apparatus according to a second embodiment of the present invention.

FIG. 6 is a block diagram illustrating an example of a construction of an information reproduction apparatus according to a second embodiment of the present invention.

In FIG. 6, an information reproduction apparatus according to the second embodiment of the present invention comprises a pickup 201, a sag detection part 202, a sag cancellation controller 203, a sag cancellation part 204, and an AD conversion part 205. Here, the sag detection part 202, the sag cancellation controller 203, and the sag cancellation part 204 are constructed by digital circuits, respectively.

The pickup 201 extracts information recorded in a medium, and outputs the extracted signal S201 to the AD conversion part 205.

The AD conversion part 205 subjects the pickup output signal S201 to AD conversion, and outputs a digital output signal S205 as a digitized pickup output signal to the sag detection part 202, the sag cancellation controller 203, and the sag cancellation part 204, respectively.

The sag detection part 202 detects a state of a transient of the digital output signal S205, and outputs the detected state of the transient to the sag cancellation part 204 as a transient state detection signal S202.

The sag cancellation controller 203 detects whether the digital output signal S205 is normal or abnormal, and outputs, to the sag cancellation part 204, a sag cancellation control signal S203 indicating that the digital output signal S205 is normal or that it is abnormal.

On the basis of the sag cancellation control signal S203 outputted from the sag cancellation controller 203, the sag cancellation part 204 performs no correction of a transient of the digital output signal S205 outputted from the AD conversion part 205 during a period when the digital output signal S205 is normal, while the sag cancellation part 204 performs a correction of a transient of the digital output signal S205 outputted from the AD conversion part 205 on the basis of the transient state detection signal S202 outputted from the sag detection part only during a period when the digital output signal S205 is abnormal, thereby outputting the generated signal as a reproduced signal S204.

Then, the information reproduction apparatus according to the second embodiment of the present invention is different from the information reproduction apparatus according to the first embodiment in that the input signal to the sag detection part 202, the sag cancellation controller 203, and the sag cancellation part 204 is not a pickup output signal S201 outputted from the pickup 201 but a signal S205 obtained by subjecting the pickup output signal S201 to AD conversion, while the fundamental operations of the sag detection part 202, the sag cancellation controller 203, and the sag cancellation part 204 are identical to those described in the first embodiment.

As described above, the information reproduction apparatus according to the second embodiment of the present invention is provided with an AD conversion part 205 which subjects the pickup output signal S201 from the pickup 201 to AD conversion, and the sag detection part 202, the sag cancellation controller 203, and the sag cancellation part 204 are constructed by digital circuits, thereby obtaining a circuit configuration that is advantageous to a process shrink. Further, unlike a case where the sag detection part 202, the sag cancellation controller 203, and the sag cancellation part 204 are constructed by analog circuits, capacitors and the like are dispensed with, thereby resulting in reduction in a circuit area.

Embodiment 3

Figure 7:
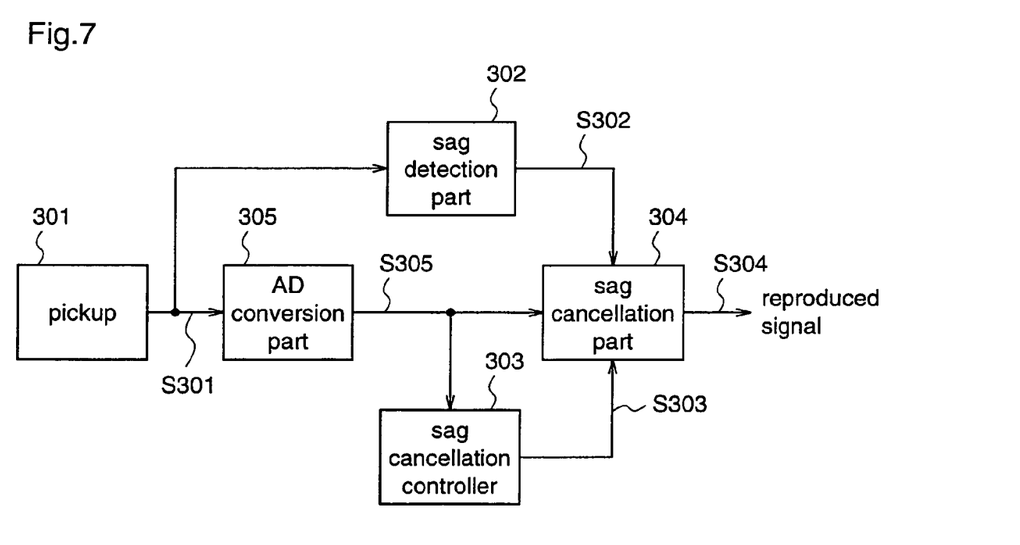
FIG. 7 is a block diagram illustrating an example of a construction of an information reproduction apparatus according to a third embodiment of the present invention.

FIG. 7 is a block diagram illustrating an example of a construction of an information reproduction apparatus according to a third embodiment of the present invention.

In FIG. 7, an information reproduction apparatus according to the third embodiment of the present invention comprises a pickup 301, a sag detection part 302, a sag cancellation controller 303, a sag cancellation part 304, and an AD conversion part 305. Here, the sag detection part 302 is constructed by an analog circuit, and the sag cancellation controller 303 and the sag cancellation part 304 are constructed by digital circuits, respectively.

The pickup 301 extracts information recorded in a medium, and outputs the extracted signal S301 to the sag detection part 302 and the AD conversion part 305, respectively.

The AD conversion part 305 subjects the pickup output signal S301 to AD conversion, and outputs a digital output signal S305 as a digitized pickup output signal to the sag cancellation controller 303 and the sag cancellation part 304, respectively.

The sag detection part 302 detects a state of a transient of the pickup output signal S301, and outputs the detected state of the transient to the sag cancellation part 304 as a transient state detection signal S302.

The sag cancellation controller 303 detects whether the digital output signal S305 is normal or abnormal, and outputs, to the sag cancellation part 304, a sag cancellation control signal S303 indicating that the digital output signal S305 is normal or that it is abnormal.

On the basis of the sag cancellation control signal S303 outputted from the sag cancellation controller 303, the sag cancellation part 304 performs no correction of a transient of the digital output signal S305 outputted from the AD conversion part 305 during a period when the digital output signal S305 is normal, while the sag cancellation part 304 performs a correction of a transient of the digital output signal S305 outputted from the AD conversion part 305 on the basis of the transient state detection signal S302 outputted from the sag detection part only during a period when the digital output signal S305 is abnormal, thereby outputting the generated signal as a reproduced signal S304.

Then, the information reproduction apparatus according to the third embodiment of the present invention is different from the information reproduction apparatus according to the first embodiment in that the input signal to the sag cancellation controller 303 and the sag cancellation part 304 is not a pickup output signal S301 outputted from the pickup 301 but a signal S305 obtained by subjecting the pickup output signal S301 to AD conversion, while the fundamental operations of the sag detection part 302, the sag cancellation controller 303, and the sag cancellation part 304 are identical to those described in the first embodiment.

As described above, the information reproduction apparatus according to the third embodiment of the present invention is provided with an AD conversion part 305 which subjects the pickup output signal S301 from the pickup 301 to AD conversion, and the sag cancellation controller 303 and the sag cancellation part 304 are constructed by digital circuits. Therefore, with maintaining the response performance of the sag detection part 302, circuit configurations which are advantageous to process shrinks can be obtained for the sag cancellation controller 303 and the sag cancellation part 304 which are constructed by the digital circuits. Further, unlike a case where the sag cancellation controller 303 and the sag cancellation part 304 are constructed by analog circuits, capacitors and the like are dispensed with, thereby resulting in reduction in a circuit area.

Embodiment 4

Figure 8:
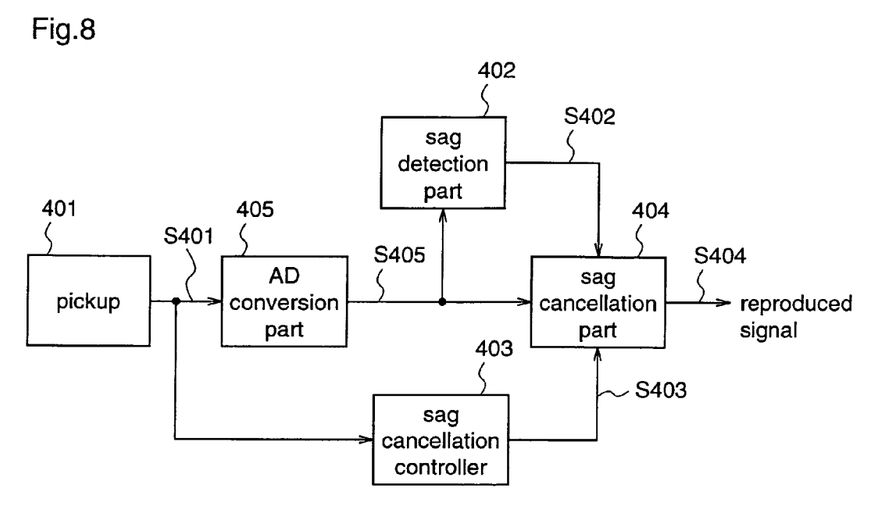
FIG. 8 is a block diagram illustrating an example of a construction of an information reproduction apparatus according to a fourth embodiment of the present invention.

FIG. 8 is a block diagram illustrating an example of a construction of an information reproduction apparatus according to a fourth embodiment of the present invention.

In FIG. 8, an information reproduction apparatus according to the fourth embodiment of the present invention comprises a pickup 401, a sag detection part 402, a sag cancellation controller 403, a sag cancellation part 404, and an AD conversion part 405. Here, the sag cancellation controller 403 is constructed by an analog circuit, and the sag detection part 402 and the sag cancellation part 404 are constructed by digital circuits, respectively.

The pickup 401 extracts information recorded in a medium, and outputs the extracted signal S401 to the sag cancellation controller 403 and the AD conversion part 405, respectively.

The AD conversion part 405 subjects the pickup output signal S401 to AD conversion, and outputs a digital output signal S405 as a digitized pickup output signal to the sag detection part 402 and the sag cancellation part 404, respectively.

The sag detection part 402 detects a state of a transient of the digital output signal S405, and outputs the detected state of the transient to the sag cancellation part 404 as a transient state detection signal S402.

The sag cancellation controller 403 detects whether the pickup output signal S401 is normal or abnormal, and outputs, to the sag cancellation part 404, a sag cancellation control signal S403 indicating that the pickup output signal S401 is normal or that it is abnormal.

On the basis of the sag cancellation control signal S403 outputted from the sag cancellation controller 403, the sag cancellation part 404 performs no correction of a transient of the digital output signal S405 outputted from the AD conversion part 405 during a period when the digital output signal S405 is normal, while the sag cancellation part 404 performs a correction of a transient of the digital output signal S405 outputted from the AD conversion part 405 on the basis of the transient state detection signal S402 outputted from the sag detection part only during a period when the digital output signal S405 is abnormal, thereby outputting the generated signal as a reproduced signal S404.

Then, the information reproduction apparatus according to the fourth embodiment of the present invention is different from the information reproduction apparatus according to the first embodiment in that the input signal to the sag detection part 402 and the sag cancellation part 404 is not a pickup output signal S401 outputted from the pickup 401 but a signal S405 obtained by subjecting the pickup output signal S401 to AD conversion, while the fundamental operations of the sag detection part 402, the sag cancellation controller 403, and the sag cancellation part 404 are identical to those described in the first embodiment.

As described above, the information reproduction apparatus according to the fourth embodiment of the present invention is provided with an AD conversion part 405 which subjects the pickup output signal S401 from the pickup 401 to AD conversion, and the sag detection part 402 and the sag cancellation part 404 are constructed by digital circuits. Therefore, with maintaining the response performance of the sag cancellation controller 403 constructed by an analog circuit, the circuit configurations which are advantageous to process shrinks can be obtained for the sag detection part 402 and the sag cancellation part 404 which are constructed by the digital circuits. Further, unlike a case where the sag detection part 402 and the sag cancellation part 404 are constructed by analog circuits, capacitors and the like are dispensed with, thereby resulting in reduction in a circuit area.

Embodiment 5

Figure 9:
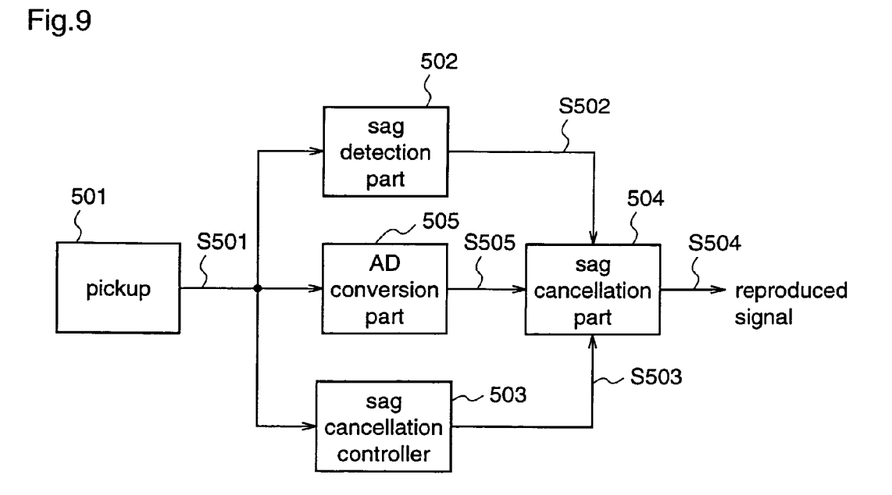
FIG. 9 is a block diagram illustrating an example of a construction of an information reproduction apparatus according to a fifth embodiment of the present invention.

FIG. 9 is a block diagram illustrating an example of a construction of an information reproduction apparatus according to a fifth embodiment of the present invention.

In FIG. 9, an information reproduction apparatus according to the fifth embodiment of the present invention comprises a pickup 501, a sag detection part 502, a sag cancellation controller 503, a sag cancellation part 504, and an AD conversion part 505. Here, the sag detection part 502 and the sag cancellation controller 503 are constructed by analog circuits, respectively, and the sag cancellation part 504 is constructed by a digital circuit.

The pickup 501 extracts information recorded in a medium, and outputs the extracted signal S501 to the sag detection part 502, the sag cancellation controller 503 and the AD conversion part 505, respectively.

The AD conversion part 505 subjects the pickup output signal S501 to AD conversion, and outputs a digital output signal S505 as a digitized pickup output signal to the sag cancellation part 504.

The sag detection part 502 detects a state of a transient of the pickup output signal S501, and outputs the detected state of the transient to the sag cancellation part 504 as a transient state detection signal S502.

The sag cancellation controller 503 detects whether the pickup output signal S501 is normal or abnormal, and outputs, to the sag cancellation part 504, a sag cancellation control signal S503 indicating that the pickup output signal S501 is normal or that it is abnormal.

On the basis of the sag cancellation control signal S503 outputted from the sag cancellation controller 503, the sag cancellation part 504 performs no correction of a transient of the digital output signal S505 outputted from the AD conversion part 505 during a period when the digital output signal S505 is normal, while the sag cancellation part 504 performs a correction of a transient of the digital output signal S505 outputted from the AD conversion part 505 on the basis of the transient state detection signal S502 outputted from the sag detection part only during a period when the digital output signal S505 is abnormal, thereby outputting the generated signal as a reproduced signal S504.

Then, the information reproduction apparatus according to the fifth embodiment of the present invention is different from the information reproduction apparatus according to the first embodiment in that the input signal to the sag cancellation part 504 is not a pickup output signal S501 outputted from the pickup 501 but a signal S505 obtained by subjecting the pickup output signal S501 to AD conversion, while the fundamental operations of the sag detection part 502, the sag cancellation controller 503, and the sag cancellation part 504 are identical to those described in the first embodiment.

As described above, the information reproduction apparatus according to the fifth embodiment of the present invention is provided with an AD conversion part 505 which subjects the pickup output signal S501 from the pickup 501 to AD conversion, and the sag cancellation part 504 is constructed by a digital circuit. Therefore, with maintaining the response performances of the sag detection part 502 and the sag cancellation controller 503 which are constructed by analog circuits, a circuit configuration that is advantageous to a process shrink can be obtained for the sag cancellation part 504 which is constructed by a digital circuit. Further, unlike a case where the sag cancellation part 504 is constructed by an analog circuit, capacitors and the like are dispensed with, thereby resulting in reduction in a circuit area.

Embodiment 6

Next, an information reproduction apparatus according to a sixth embodiment of the present invention will be described wherein a sag cancellation controller detects whether the pickup output signal is normal or abnormal on the basis of a de-tracking detection signal which indicates that a pickup is in a de-tracking state, as another form of the sag cancellation controller 103 described in the first embodiment.

Figure 10:
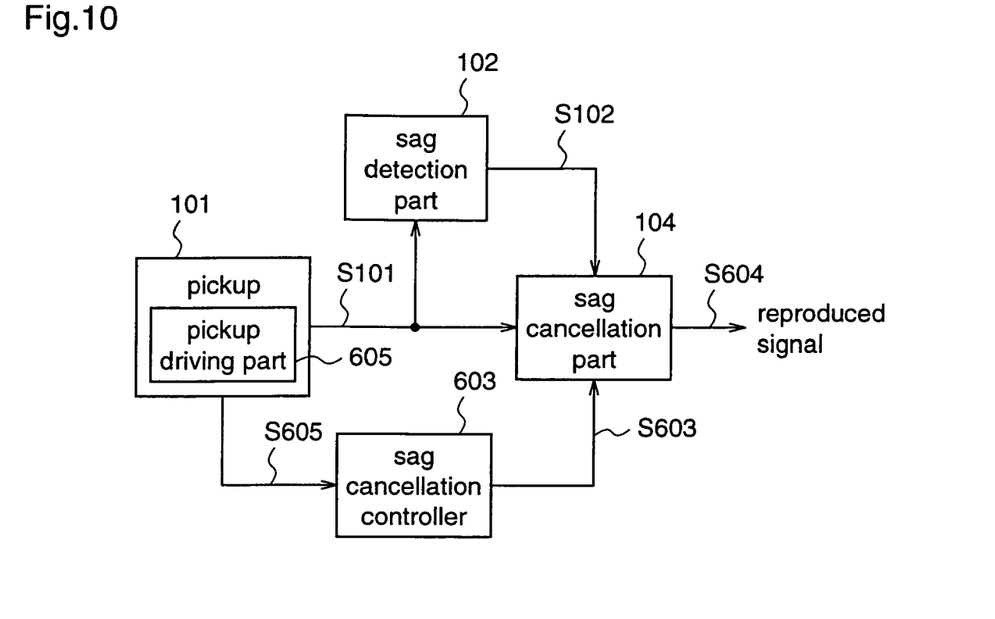
FIG. 10 is a block diagram illustrating an example of a construction of an information reproduction apparatus according to a sixth embodiment of the present invention.

FIG. 10 is a block diagram illustrating an example of a construction of an information reproduction apparatus according to the sixth embodiment of the present invention.

In FIG. 10, an information reproduction apparatus according to the present invention comprises a pickup 101, a sag detection part 102, a sag cancellation controller 603, and a sag cancellation part 104. Then, in the information reproduction apparatus according to the sixth embodiment of the present invention, the same constituents as those in the information reproduction apparatus according to the first embodiment of the present invention are denoted by the same reference numerals, and the description is omitted here.

The sag cancellation controller 603 detects whether the pickup output signal S101 is normal or abnormal, and here judges a de-tracking part as an abnormal signal and judges a part other than the de-tracking part as a normal signal on the basis of the de-tracking detection signal S605 detected by a pickup driving part 605 for controlling the pickup 101, and outputs the signal as a sag cancellation control signal S603 indicating that the pickup output signal S101 is normal or that it is abnormal to the sag cancellation part 104.

Then, the pickup driving part 605 included in the pickup 101 controls the driving of the pickup 101 as well as detects that the pickup is in a de-tracking state and outputs the detected de-tracking detection information to the sag cancellation controller 603 as a de-tracking detection signal S605.

Next, an operation of the sag cancellation controller 603 will be described.

Figure 11:
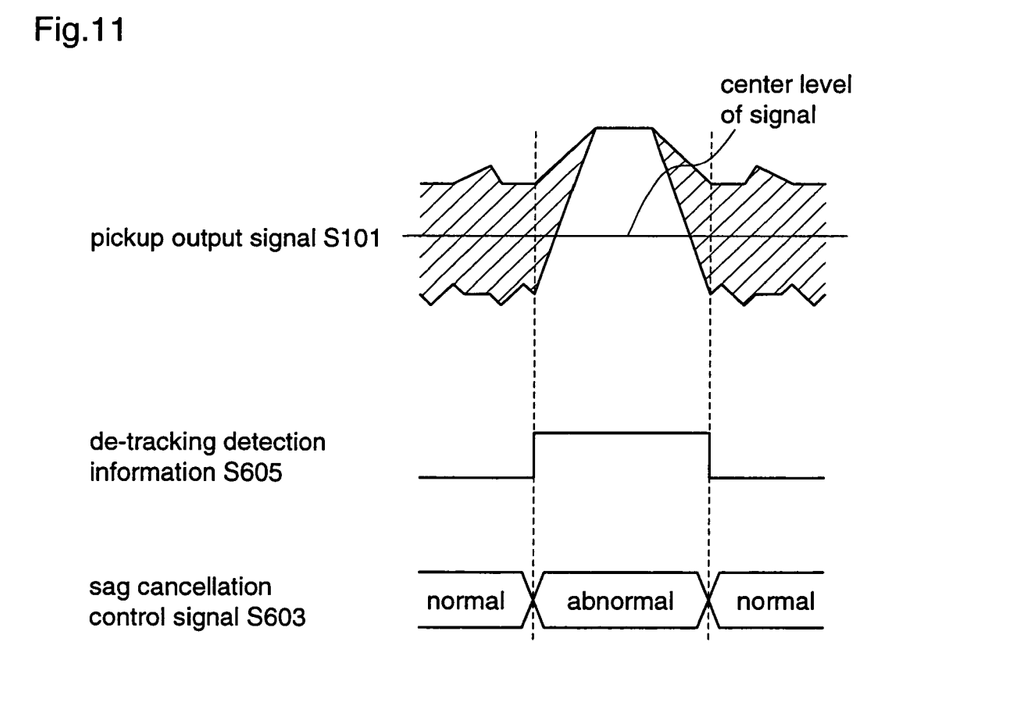
FIG. 11 is a diagram for explaining an operation of a sag cancellation controller in the information reproduction apparatus according to the sixth embodiment of the present invention.

FIG. 11 is a diagram for explaining an operation of the sag cancellation controller 603.

In FIG. 11, a pickup output signal S101 outputted from the pickup 101, a de-tracking detection signal S605 outputted from the pickup driving part 605, and a sag cancellation control signal S603 outputted from the sag cancellation controller 603 are shown in order starting at the top.

When the sag cancellation controller 603 receives a de-tracking detection signal S605 indicating that the pickup is in a de-tracking state, from the pickup driving part 605 for controlling the driving of the pickup, the sag cancellation controller 603 judges the de-tracking part as an abnormal signal and judges a part other than the de-tracking part as a normal signal on the basis of the de-tracking detection signal S605, and outputs a sag cancellation control signal S603 shown in FIG. 11 to the sag cancellation part 104.

Thereafter, as described in the first embodiment, the sag cancellation part 104 decides whether a correction of a transient of the pickup output signal S101 is to be performed or not on the basis of the sag cancellation control signal S603 outputted from the sag cancellation controller 603, and performs the correction of the transient only on a signal requiring the correction of the transient As described above, in the information reproduction apparatus according to the sixth embodiment of the present invention, the sag cancellation controller 603 detects whether the pickup output signal S101 is normal or abnormal on the basis of the de-tracking detection signal S605 detected by the pickup driving part 605, and the sag cancellation part 104 performs a correction of a transient only during a period when the pickup output signal S101 is detected as abnormal, thereby preventing degradation of signal quality, which is caused by performing a correction of a transient on a normal signal part, and an appropriate correction of a transient can be performed on an abnormal signal part, thereby resulting in a stable reproduced signal S604 obtained by the sag cancellation part 104.

Then, while in the information reproduction apparatus according to the sixth embodiment of the present invention the sag cancellation controller 603 generates the sag cancellation control signal S603 on the basis of the de-tracking detection signal S605 detected by the pickup driving part 605, the sag cancellation controller 603 may judge a period during which either a de-tracking or a defect is detected as an abnormal signal on the basis of the de-tracking detection signal S605, and the defect information that is described in the first embodiment, thereby to generate the sag cancellation control signal S603.

Further, while in the information reproduction apparatus according to the sixth embodiment of the present invention, it is described that with illustrating the information reproduction apparatus according to the first embodiment as an example, the sag cancellation controller 603 detects whether the pickup output signal is normal or abnormal on the basis of the de-tracking detection signal indicating that the pickup 101 is in a de-tracking state, the processing performed by the sag cancellation controller 603 described in the sixth embodiment are similarly applicable in the information reproduction apparatus described in the second to fifth embodiments of the present invention.

Embodiment 7

Next, an information reproduction apparatus according to a seventh embodiment of the present invention will be described wherein a sag cancellation controller detects whether the pickup output signal is normal or abnormal on the basis of a PLL state signal outputted from a PLL, as another form of the sag cancellation controller 103 described in the first embodiment.

Figure 12:
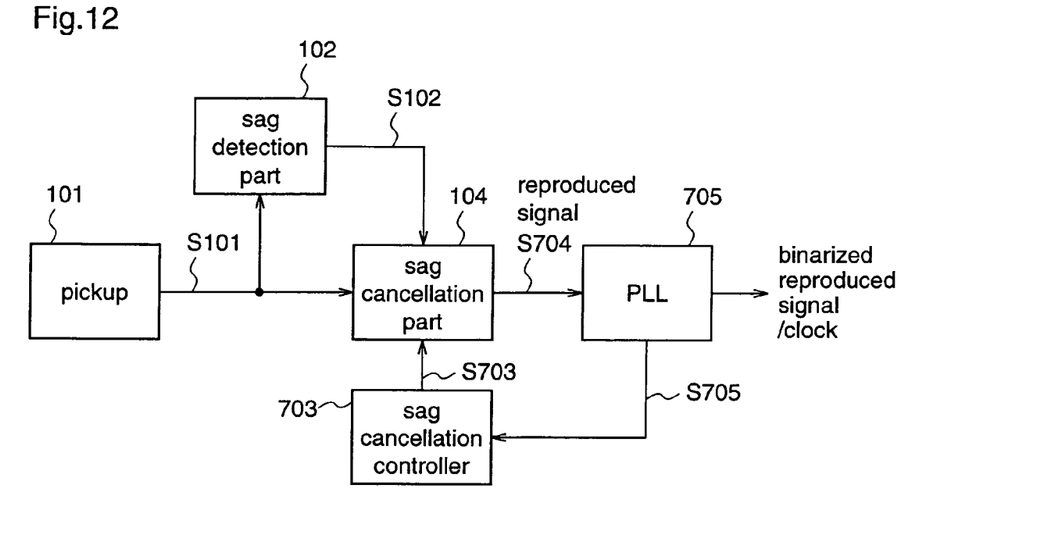
FIG. 12 is a block diagram illustrating an example of a construction of an information reproduction apparatus according to a seventh embodiment of the present invention.

FIG. 12 is a block diagram illustrating an example of a construction of an information reproduction apparatus according to a seventh embodiment of the present invention.

In FIG. 12, an information reproduction apparatus according to the present invention comprises a pickup 101, a sag detection part 102, a sag cancellation controller 703, a sag cancellation part 104, and a PLL 705. Then, in the information reproduction apparatus according to the seventh embodiment of the present invention, the same signals and constituents as those described for the information reproduction apparatus according to the first embodiment of the present invention are denoted by the same reference numerals, and the description is omitted here.

The PLL 705 performs PLL processing for making a binarized signal of a reproduced signal S704 outputted from the sag cancellation part 104 follow a reference frequency, and outputs state information indicating a state of frequency following or phase following in the PLL processing to the sag cancellation controller 703 as a PLL state signal S705. While in this embodiment a signal indicating a state of phase following is outputted as the state signal S705, a signal indicating a state of frequency following or both states of frequency following and phase following, and the like may be otherwise used as the state signal S705.

The sag cancellation controller 703 detects whether the pickup output signal S101 is normal or abnormal, and here judges a period during which the phase following is NG as an abnormal signal and judges a period during which the phase following is OK as a normal signal, on the basis of the PLL state signal S705 outputted from the PLL 705, and outputs the signal as a sag cancellation control signal S703 indicating that the pickup output signal S101 is normal or that it is abnormal to the sag cancellation part 104.

Next, an operation of the sag cancellation controller 703 will be described.

Figure 13:
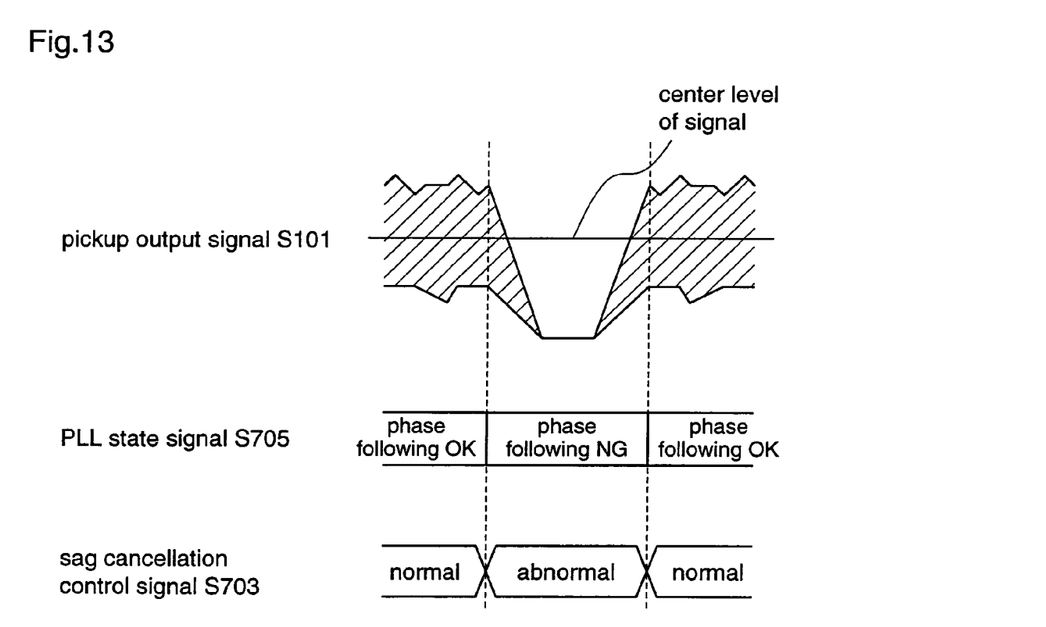
FIG. 13 is a diagram for explaining an operation of a sag cancellation controller in the information reproduction apparatus according to the seventh embodiment of the present invention.

FIG. 13 is a diagram for explaining an operation of the sag cancellation controller 703.

In FIG. 13, a pickup output signal S101 outputted from the pickup 101, a PLL state signal S705 outputted from the PLL 705, and a sag cancellation control signal S703 outputted from the sag cancellation controller 703 are shown in order starting at the top.

When the sag cancellation controller 703 receives a PLL state signal S705 outputted from the PLL 705, the sag cancellation controller 703 judges a period during which phase following is NG as an abnormal signal, and judges a period during which phase following is OK as a normal signal on the basis of the state signal S706, and outputs a sag cancellation control signal S703 shown in FIG. 13 to the sag cancellation part 104.

Thereafter, as described in the first embodiment, the sag cancellation part 104 decides whether a correction of a transient of the pickup output signal S101 is to be performed or not on the basis of the sag cancellation control signal S703 outputted from the sag cancellation controller 703, and performs the correction of the transient only on a signal requiring the correction of the transient.

As described above, in the information reproduction apparatus according to the seventh embodiment of the present invention, the sag cancellation controller 703 detects whether the pickup output signal S101 is normal or abnormal on the basis of the PLL state signal S705 outputted from the PLL 705, and the sag cancellation part 104 performs a correction of a transient only during a period when the pickup output signal S101 is detected as abnormal, thereby preventing degradation of signal quality, which is caused by performing a correction of a transient on a normal signal part, and an appropriate correction of a transient can be performed on an abnormal signal part, thereby resulting in a stable reproduced signal S704 obtained by the sag cancellation part 104.

Further, while in the information reproduction apparatus according to the seventh embodiment of the present invention, it is described that with illustrating the information reproduction apparatus according to the first embodiment as an example, the sag cancellation controller 703 detects whether the pickup output signal is normal or abnormal on the basis of the PLL state signal that is outputted from the PLL, the processing performed by the sag cancellation controller 703 described in the seventh embodiment may be similarly applicable in the information reproduction apparatus described in the second to fifth embodiments of the present invention.

APPLICABILITY IN INDUSTRY

According to the present invention, a correction of a transient is performed only during a period when a pickup output signal is abnormal, thereby enabling degradation of quality of a reproduced signal in a normal signal part to be reduced and a stable reproduced signal to be obtained.

The invention claimed is:

1. An information reproduction apparatus that reproduces information recorded in a medium, comprising:
   a pickup for extracting the information recorded in the medium and outputting the extracted signal;
   a sag detection part for detecting a transient state of the signal outputted from the pickup and outputting the detection result as a transient state detection signal;
   a sag cancellation controller for detecting whether the signal outputted from the pickup is normal or abnormal; and
   a sag cancellation part for performing no correction of a transient on the signal outputted from the pickup during a period that is judged as normal by the sag cancellation controller, and performing a correction of a transient on the signal outputted from the pickup on the basis of the transient state detection signal outputted from the sag detection part only during a period that is judged as abnormal by the sag cancellation controller.

2. The information reproduction apparatus as defined in claim 1, wherein
   the sag cancellation controller judges whether the signal outputted from the pickup is normal or abnormal, on the basis of defect information that is detected from the signal outputted from the pickup.

3. The information reproduction apparatus as defined in claim 2, wherein
   the sag cancellation controller further extends, by a predetermined period, a defect period indicated by the defect information, and judges the extended period as a period during which the signal extracted by the pickup is abnormal.

4. The information reproduction apparatus as defined in claim 1, wherein
   the sag cancellation controller judges whether the signal outputted from the pickup is normal or abnormal, on the basis of de-tracking detection information indicating that the pickup is in a de-tracking state.

5. The information reproduction apparatus as defined in claim 1, wherein
   the sag cancellation controller judges whether the signal extracted by the pickup is normal or abnormal, on the basis of de-tracking detection information indicating that the pickup is in a de-tracking state, and defect information that is detected from the signal outputted from the pickup.

6. The information reproduction apparatus as defined in claim 5, wherein
   the sag cancellation controller further extends, by a predetermined period, a defect period indicated by the defect information, and judges the extended period as a period during which the signal extracted by the pickup is abnormal.

7. The information reproduction apparatus as defined in claim 1, wherein
   the sag cancellation controller judges whether the signal outputted from the pickup is normal or abnormal, on the basis of amplitude information of the signal outputted from the pickup.

8. The information reproduction apparatus as defined in claim 1, comprising
   a PLL for making a binarized signal of the signal outputted from the sag cancellation part follow a reference frequency; and
   the sag cancellation controller judging whether the signal extracted by the pickup is normal or abnormal, on the basis of state information outputted from the PLL.

9. An information reproduction apparatus that reproduces information recorded in a medium, comprising:
   a pickup for extracting the information recorded in the medium and outputting the extracted signal;
   an AD conversion part for subjecting the signal outputted from the pickup to analog-digital conversion;
   a sag detection part for detecting a transient state of the digital signal outputted from the AD conversion part and outputting the detection result as a transient state detection signal;
   a sag cancellation controller for detecting whether the digital signal outputted from the AD conversion part is normal or abnormal; and
   a sag cancellation part for performing no correction of a transient on the digital signal outputted from the AD conversion part during a period that is judged as normal by the sag cancellation controller, and performing a correction of a transient on the digital signal outputted from the AD conversion part on the basis of the transient state detection signal outputted from the sag detection part only during a period that is judged as abnormal by the sag cancellation controller.

10. The information reproduction apparatus as defined in claim 9, wherein
    the sag cancellation controller judges whether the signal outputted from the pickup is normal or abnormal, on the basis of defect information that is detected from the signal outputted from the pickup.

11. The information reproduction apparatus; as defined in claim 10, wherein
    the sag cancellation controller further extends, by a predetermined period, a defect period indicated by the defect information, and judges the extended period as a period during which the signal extracted by the pickup is abnormal.

12. The information reproduction apparatus as defined in claim 9, wherein the sag cancellation controller judges whether the signal outputted from the pickup is normal or abnormal, on the basis of de-tracking detection information indicating that the pickup is in a de-tracking state.

13. The information reproduction apparatus as defined in claim 9, wherein
the sag cancellation controller judges whether the signal extracted by the pickup is normal or abnormal, on the basis of de-tracking detection information indicating that the pickup is in a de-tracking state, and defect information that is detected from the signal outputted from the pickup.

14. The information reproduction apparatus as defined in claim 13, wherein
the sag cancellation controller further extends, by a predetermined period, a defect period indicated by the defect information, and judges the extended period as a period during which the signal extracted by the pickup is abnormal.

15. The information reproduction apparatus as defined in claim 9, wherein
the sag cancellation controller judges whether the signal outputted from the pickup is normal or abnormal, on the basis of amplitude information of the signal outputted from the pickup.

16. The information reproduction apparatus as defined in claim 9, comprising
a PLL for making a binarized signal of the signal outputted from the sag cancellation part follow a reference frequency; and
the sag cancellation controller judging whether the signal extracted by the pickup is normal or abnormal, on the basis of state information outputted from the PLL.

17. An information reproduction apparatus that reproduces information recorded in a medium, comprising:
a pickup for extracting the information recorded in the medium and outputting the extracted signal;
an AD conversion part for subjecting the signal outputted from the pickup to analog-digital conversion;
a sag detection part for detecting a transient state of the signal outputted from the pickup and outputting the detection result as a transient state detection signal;
a sag cancellation controller for detecting whether the digital signal outputted from the AD conversion part is normal or abnormal; and
a sag cancellation part for performing no correction of a transient on the digital signal outputted from the AD conversion part during a period that is judged as normal by the sag cancellation controller, and performing a correction of a transient on the digital signal outputted from the AD conversion part on the basis of the transient state detection signal outputted from the sag detection part only during a period that is judged as abnormal by the sag cancellation controller.

18. The information reproduction apparatus as defined in claim 17, wherein
the sag cancellation controller judges whether the signal outputted from the pickup is normal or abnormal, on the basis of defect information that is detected from the signal outputted from the pickup.

19. The information reproduction apparatus as defined in claim 18, wherein
the sag cancellation controller further extends, by a predetermined period, a defect period indicated by the defect information, and judges the extended period as a period during which the signal extracted by the pickup is abnormal.

20. The information reproduction apparatus as defined in claim 17, wherein
the sag cancellation controller judges whether the signal outputted from the pickup is normal or abnormal, on the basis of de-tracking detection information indicating that the pickup is in a de-tracking state.

21. The information reproduction apparatus as defined in claim 17, wherein
the sag cancellation controller judges whether the signal extracted by the pickup is normal or abnormal, on the basis of de-tracking detection information indicating that the pickup is in a de-tracking state, and defect information that is detected from the signal outputted from the pickup.

22. The information, reproduction apparatus as defined in claim 21, wherein
the sag cancellation controller further extends, by a predetermined period, a defect period indicated by the defect information, and judges the extended period as a period during which the signal extracted by the pickup is abnormal.

23. The information reproduction apparatus as defined in claim 17, wherein
the sag cancellation controller judges whether the signal outputted from the pickup is normal or abnormal, on the basis of amplitude information of the signal outputted from the pickup.

24. The information reproduction apparatus as defined in claim 17, comprising
a PLL for making a binarized signal of the signal outputted from the sag cancellation part follow a reference frequency; and
the sag cancellation controller judging whether the signal extracted by the pickup is normal or abnormal, on the basis of state information outputted from the PLL.

25. An information reproduction apparatus that reproduces information recorded in a medium, comprising:
a pickup for extracting the information recorded in the medium and outputting the extracted signal;
an AD conversion part for subjecting the signal outputted from the pickup to analog-digital conversion;
a sag detection part for detecting a transient state of the digital signal outputted from the AD conversion part and outputting the detection result as a transient state detection signal;
a sag cancellation controller for detecting whether the signal outputted from the pickup is normal or abnormal; and
a sag cancellation part for performing no correction of a transient on the digital signal outputted from the AD conversion part during a period that is judged as normal by the sag cancellation controller, and performing a correction of a transient on the digital signal outputted from the AD conversion part on the basis of the transient state detection signal outputted from the sag detection part only during a period that is judged as abnormal by the sag cancellation controller.

26. The information reproduction apparatus as defined in claim 25, wherein
the sag cancellation controller judges whether the signal outputted from the pickup is normal or abnormal, on the basis of defect information that is detected from the signal outputted from the pickup.

27. The information reproduction apparatus as defined in claim 26, wherein
the sag cancellation controller further extends, by a predetermined period, a defect period indicated by the defect information, and judges the extended period as a period during which the signal extracted by the pickup is abnormal.

28. The information reproduction apparatus as defined in claim 25, wherein
the sag cancellation controller judges whether the signal outputted from the pickup is normal or abnormal, on the basis of de-tracking detection information indicating that the pickup is in a de-tracking state.

29. The information reproduction apparatus as defined in claim 25, wherein
the sag cancellation controller judges whether the signal extracted by the pickup is normal or abnormal, on the basis of de-tracking detection information indicating that the pickup is in a de-tracking state, and defect information that is detected from the signal outputted from the pickup.

30. The information reproduction apparatus as defined in claim 29, wherein
the sag cancellation controller further extends, by a predetermined period, a defect period indicated by the defect information, and judges the extended period as a period during which the signal extracted by the pickup is abnormal.

31. The information reproduction apparatus as defined in claim 25, wherein
the sag cancellation controller judges whether the signal outputted from the pickup is normal or abnormal, on the basis of amplitude information of the signal outputted from the pickup.

32. The information reproduction apparatus as defined in claim 25, comprising
a PLL for making a binarized signal of the signal outputted from the sag cancellation part follow a reference frequency; and
the sag cancellation controller judging whether the signal extracted by the pickup is normal or abnormal, on the basis of state information outputted from the PLL.

33. An information reproduction apparatus that reproduces information recorded in a medium, comprising:
a pickup for extracting the information recorded in the medium and outputting the extracted signal;
an AD conversion part for subjecting the signal outputted from the pickup to analog-digital conversion;
a sag detection part for detecting a transient state of the signal outputted from the pickup and outputting the detection result as a transient state detection signal;
a sag cancellation controller for detecting whether the signal outputted from the pickup is normal or abnormal; and
a sag cancellation part for performing no correction of a transient on the digital signal outputted from the AD conversion part during a period that is judged as normal by the sag cancellation controller, and performing a correction of a transient on the digital signal outputted from the AD conversion part on the basis of the transient state detection signal outputted from the sag detection part only during a period that is judged as abnormal by the sag cancellation controller.

34. The information reproduction apparatus as defined in claim 33, wherein
the sag cancellation controller judges whether the signal outputted from the pickup is normal or abnormal, on the basis of defect information that is detected from the signal outputted from the pickup.

35. The information reproduction apparatus as defined in claim 34, wherein
the sag cancellation controller further extends, by a predetermined period, a defect period indicated by the defect information, and judges the extended period as a period during which the signal extracted by the pickup is abnormal.

36. The information reproduction apparatus as defined in claim 33, wherein
the sag cancellation controller judges whether the signal outputted from the pickup is normal or abnormal, on the basis of de-tracking detection information indicating that the pickup is in a de-tracking state.

37. The information reproduction apparatus as defined in claim 33, wherein
the sag cancellation controller judges whether the signal extracted by the pickup is normal or abnormal, on the basis of de-tracking detection information indicating that the pickup is in a de-tracking state, and defect information that is detected from the signal outputted from the pickup.

38. The information reproduction apparatus as defined in claim 37, wherein
the sag cancellation controller further extends, by a predetermined period, a defect period indicated by the defect information, and judges the extended period as a period during which the signal extracted by the pickup is abnormal.

39. The information reproduction apparatus as defined in claim 33, wherein
the sag cancellation controller judges whether the signal outputted from the pickup is normal or abnormal, on the basis of amplitude information of the signal outputted from the pickup.

40. The information reproduction apparatus as defined in claim 33, comprising
a PLL for making a binarized signal of the signal outputted from the sag cancellation part follow a reference frequency; and
the sag cancellation controller judging whether the signal extracted by the pickup is normal or abnormal, on the basis of state information outputted from the PLL.

41. An information reproduction method for reproducing information recorded in a disk, comprising:
a sag detection step of detecting a transient state of a signal read from the disk and outputting the detection result as a transient state detection signal;
a sag cancellation control step of detecting whether the signal from the disk is normal or abnormal;
a sag cancellation step of performing no correction of a transient on the signal from the disk during a period that is judged as normal in the sag cancellation control step, and performing a correction of a transient on the signal read from the disk on the basis of the transient state detection signal only during a period that is judged as abnormal in the sag cancellation control step.

* * * * *